(12) United States Patent
Howe et al.

(10) Patent No.: US 7,083,144 B2
(45) Date of Patent: Aug. 1, 2006

(54) APPARATUS AND METHODS FOR SUPPORT OF PROPULSION SYSTEMS INTERCONNECT MEMBERS

(75) Inventors: Mark E. Howe, Mukilteo, WA (US); George L. Huggins, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/920,802

(22) Filed: Aug. 18, 2004

(65) Prior Publication Data

US 2006/0038065 A1 Feb. 23, 2006

(51) Int. Cl.
*B64D 33/00* (2006.01)
(52) U.S. Cl. ........................ 244/54; 244/129.1; 244/131
(58) Field of Classification Search ............ 244/53 R, 244/54, 55; 248/554–555; 60/39.091, 226.2; 439/155, 258, 191, 255, 320, 680, 372, 180, 439/352, 154, 248, 159, 310, 700, 374, 296
See application file for complete search history.

(56) References Cited

U.S. PATENT DOCUMENTS

| 1,581,539 | A | * | 4/1926 | Kauch et al. ................. 244/54 |
| 2,997,682 | A | * | 8/1961 | Grimes et al. ............. 439/372 |
| 3,111,355 | A | * | 11/1963 | Samburoff et al. .......... 439/159 |
| 3,602,869 | A | * | 8/1971 | Metz et al. ................. 439/191 |
| 4,147,029 | A | * | 4/1979 | Sargisson .................. 60/226.2 |
| 4,291,931 | A | * | 9/1981 | Stupay ....................... 439/155 |
| 4,437,627 | A | * | 3/1984 | Moorehead .............. 60/39.091 |
| 5,467,941 | A | * | 11/1995 | Chee ........................... 244/54 |

* cited by examiner

*Primary Examiner*—Galen Barefoot
(74) *Attorney, Agent, or Firm*—Harness Dickey & Pierce P.L.C.

(57) ABSTRACT

An apparatus for supporting an aircraft system interconnect member between a strut and an engine of the aircraft. The apparatus includes a disconnect panel near the engine through which the interconnect member is connected with the engine, and a support structure movably attached to the strut and that supports the interconnect member near the strut.

18 Claims, 4 Drawing Sheets

APPARATUS AND METHODS FOR SUPPORT OF PROPULSION SYSTEMS INTERCONNECT MEMBERS

FIELD OF THE INVENTION

The present invention relates to aircraft systems and more particularly to a support structure for aircraft propulsion system interconnect members.

BACKGROUND OF THE INVENTION

A large commercial aircraft typically is subjected to forces which can cause various components to undergo deflections relative to other components of the aircraft. For example, during aircraft maneuvers and changes in engine power, deflections can occur between aircraft engines and propulsion struts. Application of take-off thrust, elevator pull-up, and rudder inputs are among the maneuvers that can induce engine-to-strut deflections.

Most aircraft engines are provided with fuel and electrical power by fluid and electrical systems routed between the engines and other areas of the aircraft. Parts of these systems which are routed to the engine through a propulsion strut can be affected by engine-to-strut deflections. Relative deflections between a strut and an engine may be accommodated to some degree by using flexible parts, e.g., flexible hoses and wire bundles. However, even flexible parts can undergo stress when subjected to deflections between strut and engine.

SUMMARY OF THE INVENTION

The present invention, in one configuration, is directed to an apparatus for supporting an aircraft system interconnect member between a strut and an engine of the aircraft. The apparatus includes a disconnect panel near the engine through which the interconnect member is connected with the engine, and a support structure movably attached to the strut and that supports the interconnect member near the strut.

In another implementation, the invention is directed to a method of routing an aircraft system interconnect member between a strut and an engine of the aircraft. A first end of the interconnect member is reversibly connected to a connection interface below the strut. The interconnect member is supported between the strut and the engine such that at least an upper portion of the interconnect member can move relative to the strut. A second end of the interconnect member is reversibly connected to a disconnect panel near the engine.

In yet another configuration, a flexible propulsion systems support structure for use in an aircraft includes a frame for supporting an upper end of a system interconnect member between a strut and an engine of the aircraft. The structure includes at least one attachment element whereby the frame is attached to the strut such that the upper end can move relative to the strut.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of various embodiments is merely exemplary in nature and is in no way intended to limit the invention, its application, or uses.

Figure 1A:
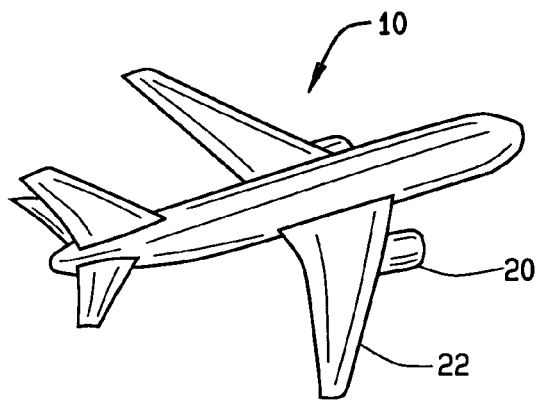
FIG. 1A is a perspective view of an aircraft.

An aircraft is indicated generally in FIG. 1A by reference number 10. The aircraft 10 is a twin-engine craft and thus includes two engine configurations 20, each mounted beneath a wing 22. It should be noted, however, that the present invention can be practiced in connection with various types of aircraft having wing-mounted engine installations.

Figure 1B:
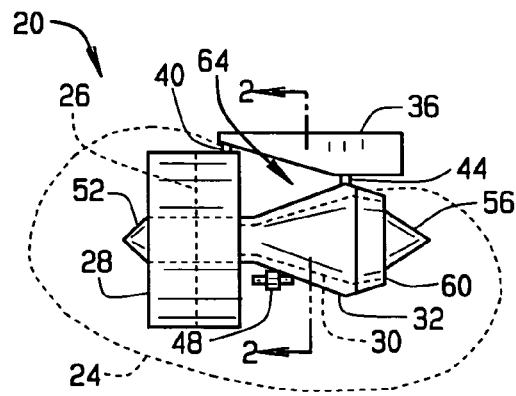
FIG. 1B is a lateral view of an aircraft engine configuration with an engine nacelle removed.

The engine configuration 20 is shown in greater detail in FIG. 1B. An engine 24 includes a fan 26 inside a fan case 28 and an engine core 30 in a core case 32. The engine 24 is mounted below a propulsion strut 36 via a front engine mount 40 attached to the fan case 28 and a rear engine mount 44 attached to the core case 32. A gear box 48 is mounted to the core case 32. Air enters the fan case 28 around a nose cone 52. Exhaust leaves the engine 24 via a core tailpipe 56 and a bypass nozzle 60. Fluid and electrical system interconnect members may be provided in a nacelle upper bifurcation zone, indicated generally by reference number 64. (A nacelle is not shown in FIG. 1B).

Figure 2:
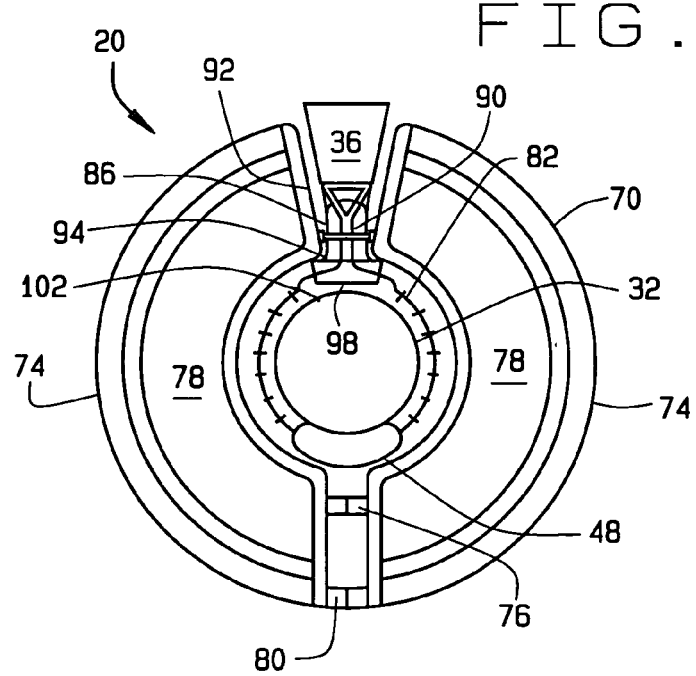
FIG. 2 is a cross-sectional view of the engine configuration shown in FIG. 1B, taken along the plane of line 2—2 in FIG. 1B.

The configuration 20 is shown in greater detail in FIG. 2. A thrust reverser cowl or nacelle 70 has two sections 74 which can be opened and closed as further described below. The cowl sections 74 are shown in a closed position in FIG. 2. The sections 74 are separated by compression pads 76 and latched together at a latch beam 80. Two fan duct sections 78 extend through the cowl sections 74. Interconnect members 82, e.g., electrical wiring and fluid lines, are supported in a rigid structural element 86 cantilevered off the bottom of the propulsion strut 36. A compression rod 90 is supported by and floats in the rigid structure 86. The rigid structure 86 terminates at its lower end 94 in a systems disconnect panel 98 close to a top 102 of the engine core case 32. The disconnect panel 98 supports re-connectable interfaces for interconnect members 82, which pass from the propulsion strut 36 to the core-mounted gear box 48.

Figure 3:
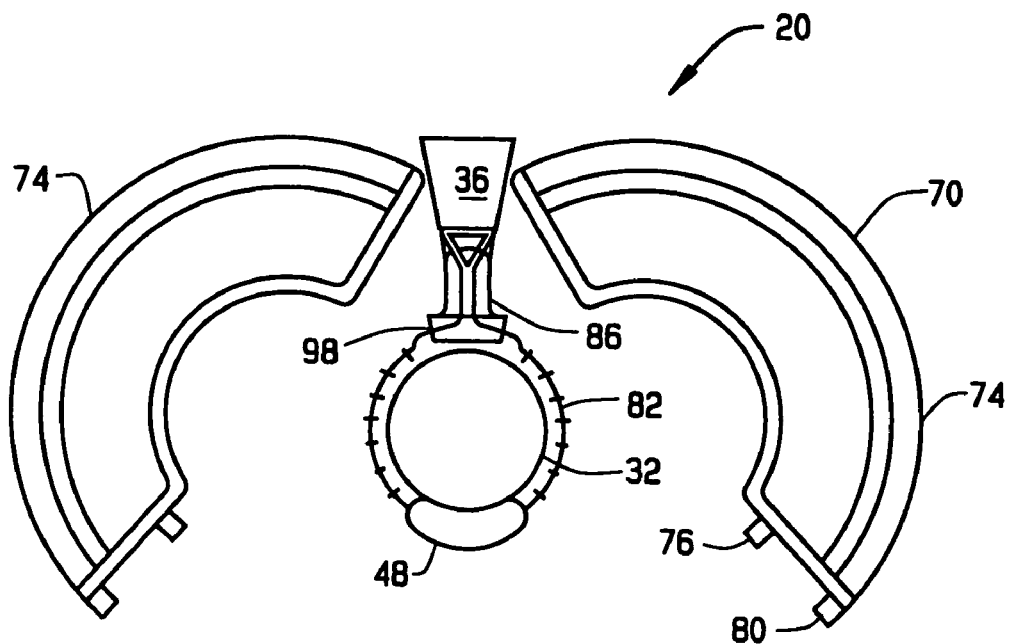
FIG. 3 is a cross-sectional view of an engine configuration with a thrust reverser cowl in an open position.
Figure 4:
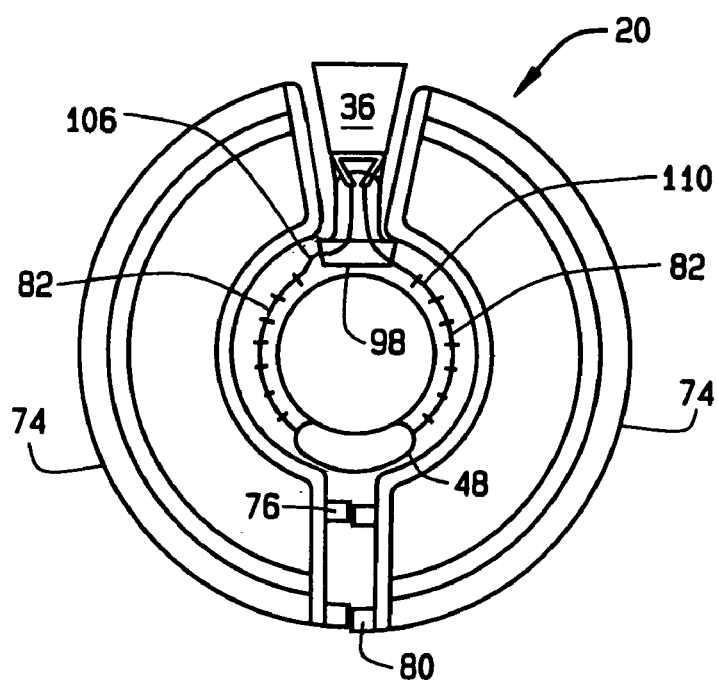
FIG. 4 is a cross-sectional view of an engine configuration.

The interconnect members 82 are removably installed between the disconnect panel 98 and gearbox 48 to facilitate maintenance, particularly when the engine 24 is installed on the aircraft and the thrust reverser cowl 70 is open, as shown in FIG. 3. The interconnect members 82 also facilitate engine installation and removal. However, although the configuration 20 accommodates relative deflection between the strut 36 and engine 24 to some degree, stresses on the interconnect members 82 still can occur. For example, when the engine 24 is deflected to the right as shown in FIG. 4, the engine motion causes interconnect members 82 to become compressed at a location 106 and stretched at a location 110.

In one configuration of the present invention, a movable support apparatus supports one or more interconnect members extending between an aircraft propulsion strut and engine. Configurations of the present invention are particularly useful in connection with high-bypass turbofan engines having a front mount located on an outer fan case and an engine-driven gearbox positioned on an engine core case.

Figure 5:
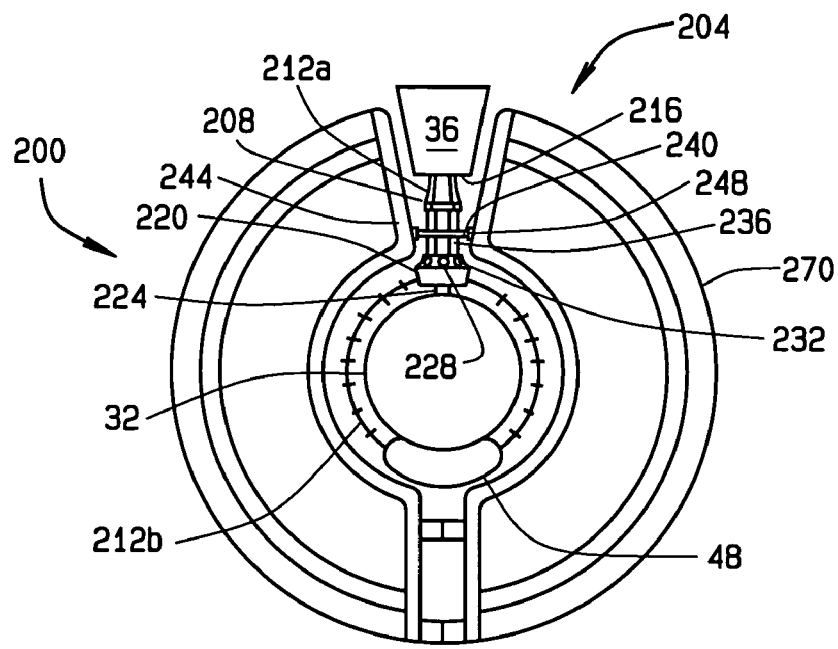
FIG. 5 is a cross-sectional view of an engine configuration having a propulsion systems support apparatus in accordance with one embodiment of the present invention.

An engine configuration in accordance with one implementation of the invention is indicated generally in FIG. 5 by reference number 200. The engine configuration 200 includes a propulsion system support apparatus indicated generally by reference number 204. For purpose of clarity, the same reference numbers will be used in the drawings to identify similar elements.

The support apparatus 204 includes a support structure 208 movably attached to the propulsion strut 36. Flexible fluid and electrical system interconnect members 212 are connected between the strut 36 and the engine gear box 48. Specifically, a portion 212a of a given interconnect member 212 is reversibly connected between a system interface 216 at the lower surface of the strut 36 and an engine interface disconnect panel 220 atop the engine core case 32. The interconnect portion 212a is routed across the support structure 208 (with one or more appropriate attachments) to the disconnect panel 220. A portion 212b of the given interconnect 212 is mounted on the core case 32 between the gear box 48 and disconnect panel 220. The term "interconnect" may be used herein and in the claims to refer to an interconnect member and/or portion(s) of an interconnect member.

The disconnect panel 220 is located near the engine core case 32 to facilitate engine maintenance, removal and/or installation. In the present configuration, the disconnect panel 220 is affixed, e.g., by brackets 224, to the engine core case 32. A user interface 228 of the panel 220 is accessible on a side 232 of the panel facing the strut 36. Thus the fluid and/or electrical systems can be disconnected by disconnecting the interconnects 212a at the panel 220 on the strut side 232, to accommodate engine removal. In the present configuration, interconnects 212b mounted on the core case 32 may be of rigid construction, since there is little if any relative motion that can be accommodated between the engine-mounted disconnect panel 220 and the engine core case 32. In another configuration, the disconnect panel 220 may be attached to a free end 236 of the support structure 208 as further described below.

A thrust reverser compression rod 240 is pinned to the support structure 208 and serves as a positioning guide to maintain clearance between the structure 208 and nacelle upper bifurcation walls 244. The compression rod 240 may be affixed to the walls 244 via ball-and-socket connections 248 or other appropriate means. The support apparatus 204 preferably is located as close as possible to a line of action about which engine-to-strut deflections tend to occur, e.g., approximately along a line between engine mounts 40 and 44 of the engine configuration 200.

Figure 6:
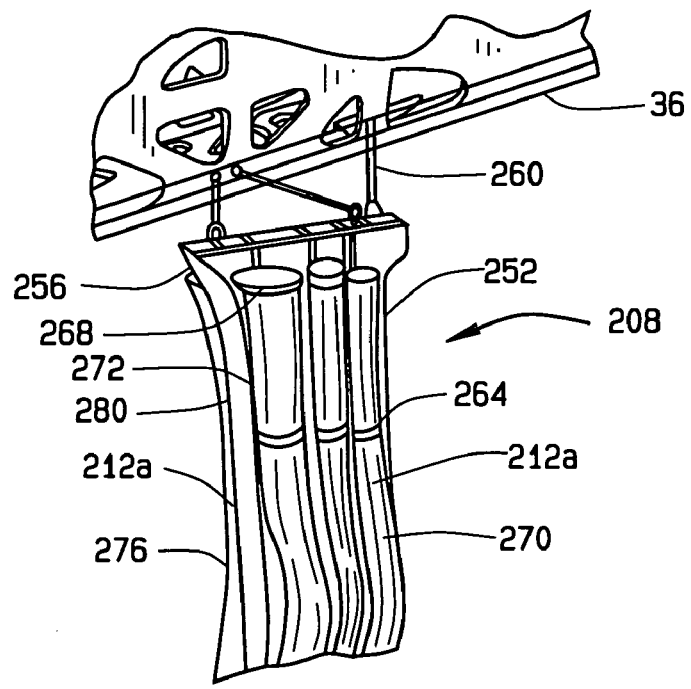
FIG. 6 is a perspective view of a system support structure in accordance with one embodiment of the present invention.

The support structure 208 is shown in greater detail in FIG. 6. The structure 208 includes a frame 252 having a top end 256 that is attached to the strut 36 by attachment elements 260, e.g., one or more tie rods or links. Other or additional attachment elements, including but not limited to one or more hinges, pins and/or pin joints, could be used. The top end 256 is attached to the strut 36 by attachment elements 260 in a flexible manner, to allow the support structure 208 to move in response to relative deflections between engine and strut.

As shown in FIG. 6, three tie rods 260 are attached in an "N" configuration between the strut 36 and frame 252. Tie rods could be attached in other or additional configurations, including but not limited to three tie rods in an "H" configuration, or two tie rods, each having one end attached to the frame 252 and the other end attached to the strut 36. It can be appreciated that the frame 252 could be movably attached to the strut 36 in many different ways, depending, for example, on component spacing and/or anticipated angle(s) of deflection. In a configuration in which one or more links include ball-end fittings, such fittings may provide angular displacements at the link ends and thus may accommodate greater deflections.

The interconnects 212a are supported in the frame 252 by ring fasteners 264, although any appropriate attachment could be used. Ends 268 of the interconnects 212a may be reversibly interconnected with electrical and/or fluid system members (not shown) extending from the strut 36. In the present exemplary configuration, interconnects 212a include fluid system interconnects 270 supported on one side 272 of the frame 252 and electrical interconnects 276 supported on another side 280.

Figure 7:
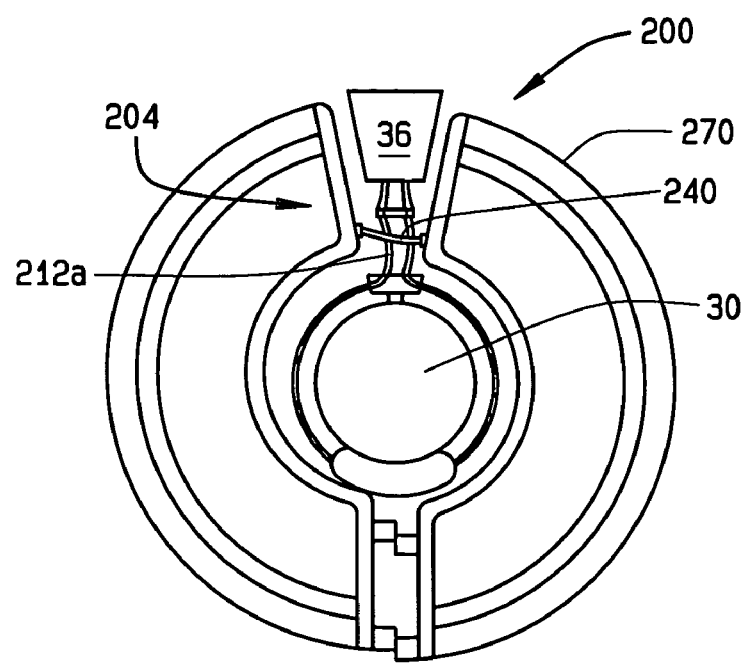
FIG. 7 is a cross-sectional view of an engine configuration having a propulsion systems support apparatus in accordance with one embodiment of the present invention.

During operation of the aircraft, for example, when the engine configuration 200 is deflected to the right as shown in FIG. 7, the support apparatus 204 allows the interconnects 212a to move flexibly in response to the deflection. The support apparatus 204 is constrained by the thrust reverser compression rod 240, yet is allowed to move in concert with the engine 30 and nacelle 270.

Figure 8:
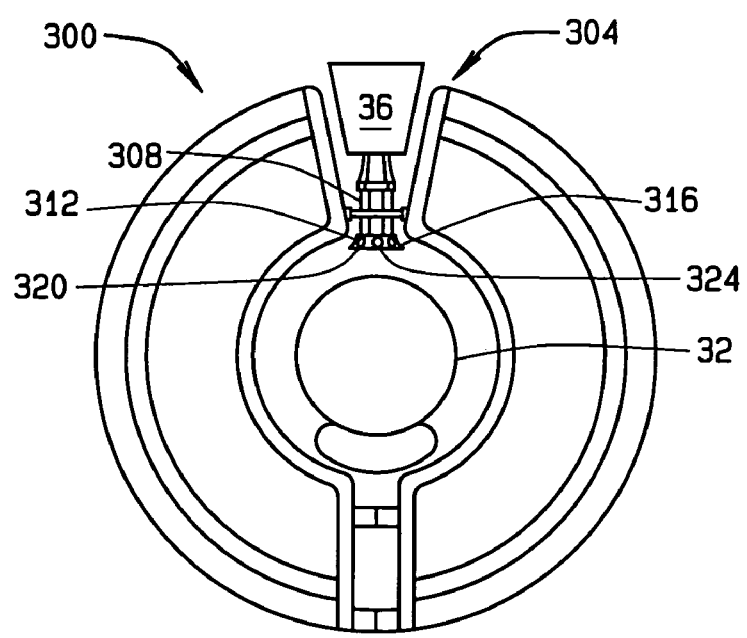
FIG. 8 is a cross-sectional view of an engine configuration having a propulsion systems support apparatus in accordance with one embodiment of the present invention.

Another engine configuration in accordance with one implementation of the invention is indicated generally in FIG. 8 by reference number 300. The engine configuration 300 includes a propulsion system support apparatus indicated generally by reference number 304. The support apparatus 304 includes a support structure 308 movably attached to the propulsion strut 36. The support structure 308 has a lower end 312 that is used to support a disconnect panel 316. The panel 316 is not attached to the engine core case 32. Fluid and electrical interconnects (not shown in FIG. 8) that are attached to the engine core case 32 preferably are sufficiently flexible to allow for maintenance and to pay out relative deflections between the strut 36 and engine core case 32. To accommodate engine removal, a user interface 320 is accessible on an engine side 324 of the disconnect panel 316.

Configurations of the above systems support apparatus solve the challenge of locating system disconnects near an aircraft engine. The above apparatus can be configured to relieve stresses on interconnecting fluid and electrical systems routed between the strut and engine, by allowing for deflection to be accommodated across the tie rods and/or other attachment elements and again between the free end of the support structure and the engine core case. Lateral deflections of the engine relative to the strut thus can be reduced to two relative angular displacements. These displacements are smaller than displacements resulting from deflections in known engine configurations.

The foregoing configurations and methods can reduce strain on fluid and electrical systems connected between a propulsion strut and engine and thereby extend the service life of hoses and wire bundles. Improving the operating conditions of hoses and wire bundles can reduce departure delays related to such components and can reduce unscheduled removal of such components. Aircraft maintenance and operating costs thus can be improved.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for supporting an aircraft system interconnect member between a strut and an engine of the aircraft, the apparatus comprising:
   a disconnect panel near the engine through which the interconnect member is connected with the engine; and
   a support structure configured to move in response to deflection between the engine and the strut while the support structure is attached to the strut and that supports the interconnect member near the strut.

2. The apparatus of claim 1, wherein the disconnect panel is affixed to the engine.

3. The apparatus of claim 1, wherein the disconnect panel is attached to the support structure.

4. The apparatus of claim 1, wherein the aircraft includes a thrust reverser cowl, the apparatus further comprising a compression rod pivotally supported by the support structure within the cowl.

5. The apparatus of claim 1, wherein the support structure comprises:
   a frame to which the interconnect member is attached; and
   one or more attachment elements connecting the frame with the strut.

6. The apparatus of claim 5, wherein the one or more attachment elements comprise at least one of a link, a hinge, a tie rod, a pin, and a pin joint.

7. The apparatus of claim 1, wherein the support structure is attached to the strut in substantial accordance with a line about which strut deflection occurs.

8. A method of routing an aircraft system interconnect member between a strut and an engine of the aircraft, the method comprising:
   reversibly connecting a first end of the interconnect member to a connection interface below the strut;
   reversibly connecting a second end of the interconnect member to a disconnect panel near the engine; and
   supporting an upper portion of the connected interconnect member between the strut and the engine while allowing the supported upper portion to move in response to relative deflection between the engine and the strut.

9. The method of claim 8, wherein the supporting is performed using a support structure movably attached to the strut.

10. The method of claim 9, wherein supporting the interconnect member comprises:
    attaching the interconnect member to a frame of the support structure; and
    attaching the support structure to the strut using one or more attachment members.

11. The method of claim 8, further comprising suspending the interconnect member from the strut.

12. The method of claim 8, wherein supporting the interconnect member comprises supporting the interconnect member substantially along a line along which the engine is mounted to the strut.

13. The method of claim 8, further comprising: mounting the disconnect panel to the engine; and
    reversibly connecting the second end of the interconnect member to a strut side of the disconnect panel.

14. The method of claim 8, further comprising:
    movably attaching a first end of a support structure to the strut;
    mounting the disconnect panel to a second end of the support structure; and
    reversibly connecting the second end of the interconnect member to an engine side of the disconnect panel.

15. A flexible propulsion systems support structure for use in an aircraft, the structure comprising:
    a frame for supporting an upper end of a system interconnect member between a strut and an engine of the aircraft; and
    at least one attachment element whereby the frame is attached to the strut such that the supported upper end is allowed to move in response to deflection between the strut and the engine.

16. The support structure of claim 15, wherein the at least one attachment element comprises at least one of a link, a hinge, a tie rod, a pin, and a pin joint.

17. The support structure of claim 15, further comprising a disconnect panel connected with a lower end of the frame.

18. The support structure of claim 15, configured to support the interconnect member substantially along a line along which the engine is mounted to the strut.

* * * * *